Oct. 29, 1963    O. HENDRICKSON    3,108,409
PNEUMATIC FILING MACHINE
Filed Aug. 2, 1961    5 Sheets-Sheet 1

Otto Hendrickson
INVENTOR.

BY *Clarence A. O'Brien*
and *Harvey B. Jacobson*
Attorneys

Oct. 29, 1963     O. HENDRICKSON     3,108,409
PNEUMATIC FILING MACHINE Filed Aug. 2, 1961     5 Sheets-Sheet 3

Otto Hendrickson
INVENTOR.

Otto Hendrickson
INVENTOR.

Oct. 29, 1963     O. HENDRICKSON     3,108,409
PNEUMATIC FILING MACHINE
Filed Aug. 2, 1961     5 Sheets-Sheet 5

Otto Hendrickson
INVENTOR.

3,108,409
PNEUMATIC FILING MACHINE
Otto Hendrickson, P.O. Box 232, Azusa, Calif., assignor of thirty-three and one-third percent to Al Lohbeck, Azusa, Calif.
Filed Aug. 2, 1961, Ser. No. 128,794
23 Claims. (Cl. 51—170)

This invention relates to a novel and useful pneumatic filing machine and more specifically to a filing machine which has been specifically adapted for use in repairing dented vehicle bodies.

While the instant invention has been primarily designed for facilitating the repair of dented vehicle bodies, it is to be noted that it will be extremely valuable and a great asset in other environments where a power filing and/or sanding machine is desirable.

The pneumatic filing machine of the instant invention has been designed primarily to provide a means for reciprocating a pair of vehicle body files disposed in side-by-side relation and in a manner which will automatically enable the cuts made by each file mounted on the pneumatic filing machine to at least partially overlap the cut made by the other file mounted on the filing machine.

The filing machine is capable of reciprocating the body files mounted thereon at high speed and the filing machine may be applied to a work surface such as a sheet metal body section having body lead applied thereto. By applying only light pressure on the filing machine, the high speed of reciprocation of the files mounted thereon will cause the sheet metal body portion to expand more than the body lead applied thereto. Accordingly, the harder sheet metal section is raised ever so slightly which results in an extremely smoothly finished surface when the sheet metal body section cools. Normally, a body file will remove more of the leaded portion of the sheet metal panel and thus cause a slight depression in the leaded portion of the panel. By applying only light pressure on the pneumatic filing machine, the sheet metal engaged by the filing machine is raised ever so slightly thereby enabling the repaired body panel to have an extremely smooth and unrippled surface when cooled.

In addition, the pneumatic filing machine is constructed in a manner whereby the body files mounted thereon are reciprocated simultaneously in opposite directions. In this manner, fore-and-aft longitudinal displacement of the filing machine is eliminated inasmuch as the thrust effected by each file is offset by the thrust effected by the other file. In addition, inasmuch as the files mounted on the filing machine are disposed in side-by-side relation, a slight oscillatory movement of the pneumatic filing machine is effected and the filing machine oscillates about an axis extending at right angles to the direction of movement of the files. In this manner, the cut made by one file is slightly overlapped by the adjacent file. Accordingly, undesirable grooves in the workpiece are eliminated. In addition, although the provision of side-by-side files being reciprocated simultaneously in opposite directions also has a tendency to oscillate the pneumatic filing machine about a transverse axis disposed in the plane of the work surface with which the files are engaged the reciprocating pistons of the pneumatic filing machine are disposed as closely adjacent the tool carriers on which the files are mounted as is possible and thus this latter type of undesirable oscillation is virtually eliminated.

The pneumatic filing machine includes numerous working surfaces and the filing machine is constructed in a manner whereby the air passages for supplying fluid under pressure to the reciprocating pistons of the filing machine are communicated with substantially all of the working surfaces of the moving parts of the filing machine whereby an oiler may be disposed in the fluid pressure line for the filing machine in order that all of the working parts of the filing machine may be lubricated.

In addition, the filing machine is constructed in a manner whereby oscillatory movement of the pistons which are operatively connected to the tool carriers of the filing machine, is controlled not only by the pressure of the air supplied to the filing machine but primarily by the amount of air supplied to the filing machine. Accordingly, a simple control valve is all that is required to start and stop operation of the pneumatic machine as well as to govern the speed of reciprocation of the tool carriers. Further, the filing machine is also constructed in a manner whereby the amount of air under pressure delivered to the filing machine governs the length of stroke of the tool carriers beyond a predetermined minimum amount.

The main object of this invention is to provide a pneumatic filing machine which may be utilized to simultaneously and oppositely reciprocate a pair of auto body files in a manner whereby the cut of one file is slightly overlapped by the cut of the other file.

A further object of this invention is to provide a pneumatic filing machine having reciprocating tool carriers whose speed and length of stroke may be operatively controlled not only by governing the pressure of air delivered to the pneumatic filing machine but also and primarily by governing the amount of air delivered to the filing machine.

A still further object of this invention is to provide a filing machine having a pair of double ended reciprocating pistons with inlet valve means provided for each piston and drivingly connected thereto by means including a lost motion connection with the valve means and with the valve means provided with means operable in response to initial movement of the valve means to admit fluid under pressure to the reciprocating pistons of the filing machine for moving the valve means toward the fully open position independently of the driving connection between the reciprocating pistons of the filing machine and the corresponding valve means whereby the valve means of the filing machine may be operated by means of and in timed sequence with the reciprocation of the pistons of the filing machine and yet not limited by the reciprocating movement of the pistons upon movement of the valve means toward the open position.

Another object of this invention is to provide a pneumatic filing machine having a pair of reciprocating tool carriers to which a pair of body files may be removably secured whereby work engaging tools other than body files may be secured to the tool carriers of the filing machine.

Another object of this invention, in accordance with the immediately preceding object, is to provide an abrasive holder attachment for each of the tool carriers of the filing machine which may be secured to the tool carriers in place of the body files in order that abrasive material such as sandpaper and the like may be reciprocated by means of the filing machine.

A final object to be specifically enumerated herein is to provide a pneumatic filing machine which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings, the numeral 10 generally designates the filing machine of the instant invention which includes an elongated body referred to in general by the reference numeral 12.

The body 12 includes opposite end head portions 14 and 16 and it will be noted that the head portion 16 includes a valve assembly generally referred to by the reference numeral 20. The valve assembly includes an inlet opening 22 to which the discharge end of a fluid pressure line 24 is secured by means of a fitting 26. The inlet opening 22 includes a valve seat 28 against which a ball check valve 30 is spring-urged by means of compression spring 32. The tension of the compression spring 32 may be adjusted by means of the abutment plug 34.

Figure 3:
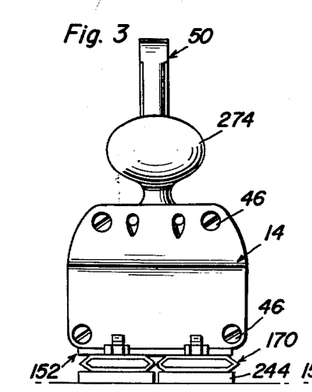
FIGURE 3 is an end elevational view as seen from the left side of FIGURE 2.
Figure 4:
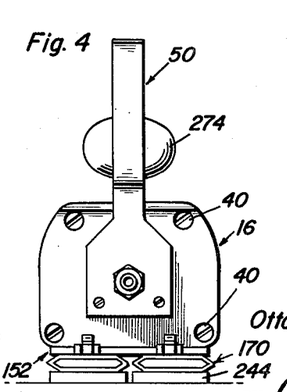
FIGURE 4 is an end elevational view as seen from the right side of FIGURE 2.
Figure 5:
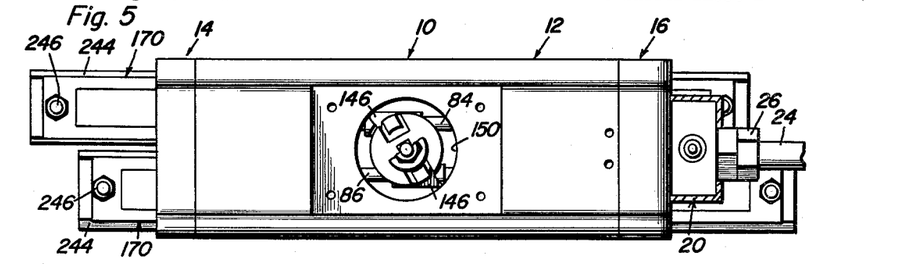
FIGURE 5 is a top plan view of the filing machine with the handle and cover plate removed and with the right side tool carrier on the power stroke.

The inlet opening 22 downstream of the ball check valve 30 is provided with a pair of branch conduits 36 and 38 and it will be noted that the head portion 16 is secured to the body 12 by means of suitable fasteners 40, see FIGURE 4, with the branch conduits 36 and 38 aligned with corresponding fluid inlet passages 42 and 44 respectively formed in and extending longitudinally through the body 12. The head portion 14 is also secured to the body 12 by means of fasteners which are designated by the reference numeral 46, see FIGURE 3.

Figure 1:
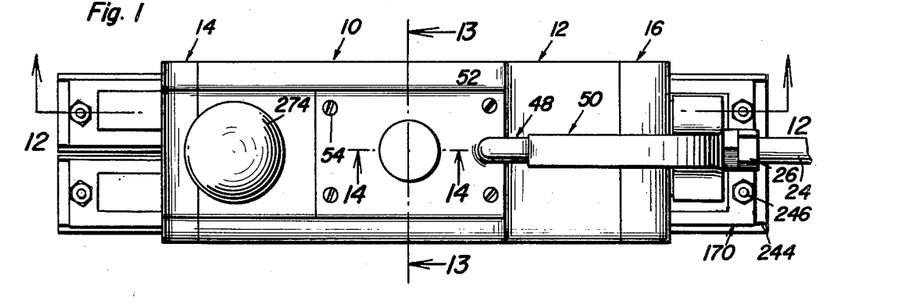
FIGURE 1 is a top plan view of the filing machine.
Figure 2:
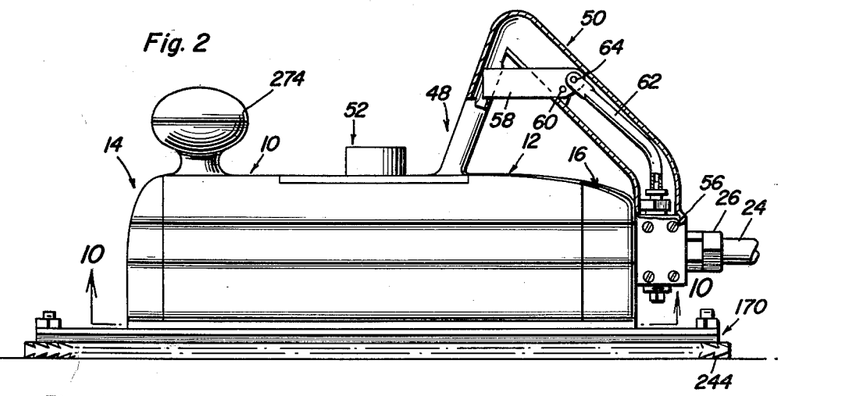
FIGURE 2 is a side elevational view of the filing machine with parts thereof being broken away and shown in section.

A handle and cover plate assembly generally referred to by the reference numeral 48 includes a handle portion generally referred to by the reference numeral 50 and a cover plate portion generally referred to by the reference numeral 52. The handle and cover plate assembly 48 is secured to the body 12 by means of fasteners 54 secured through the cover plate portion 52 and fasteners 56 securing the handle portion 50 to the head portion 16, see FIGURE 2.

A trigger member 58 is pivotally secured to the handle portion 50 as at 60 and to an actuating tube 62 as at 64. With attention now directed to FIGURE 12 of the drawings it will be seen that the end of the actuating tube 62 remote from the trigger member 58 telescopingly receives the upper end of an actuating rod 65 and abuts a collar 66 carried by the rod 65. The end of the actuating rod 64 remote from the actuating tube 62 abuts the upper surface of the ball check valve 30 and thus the ball check valve 30 may be disengaged from the valve seat 28 upon upward swinging movement of the free end of the trigger member 58 to admit fluid under pressure from the fluid pressure line 24 into the inlet passages 42 and 44.

Figure 11:
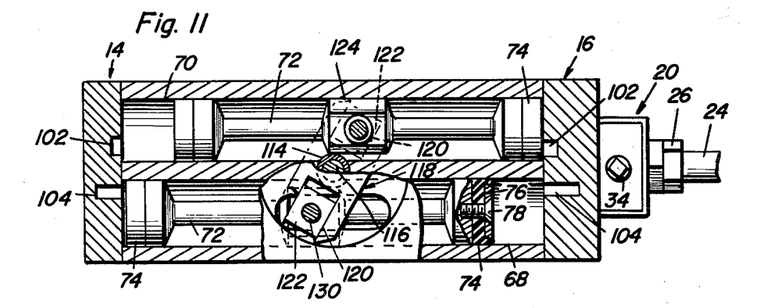
FIGURE 11 is a horizontal sectional view similar to that of FIGURE 10 with parts being broken away to show the piston structure of the filing machine.
Figures 12, 13, 14, 15, 16:
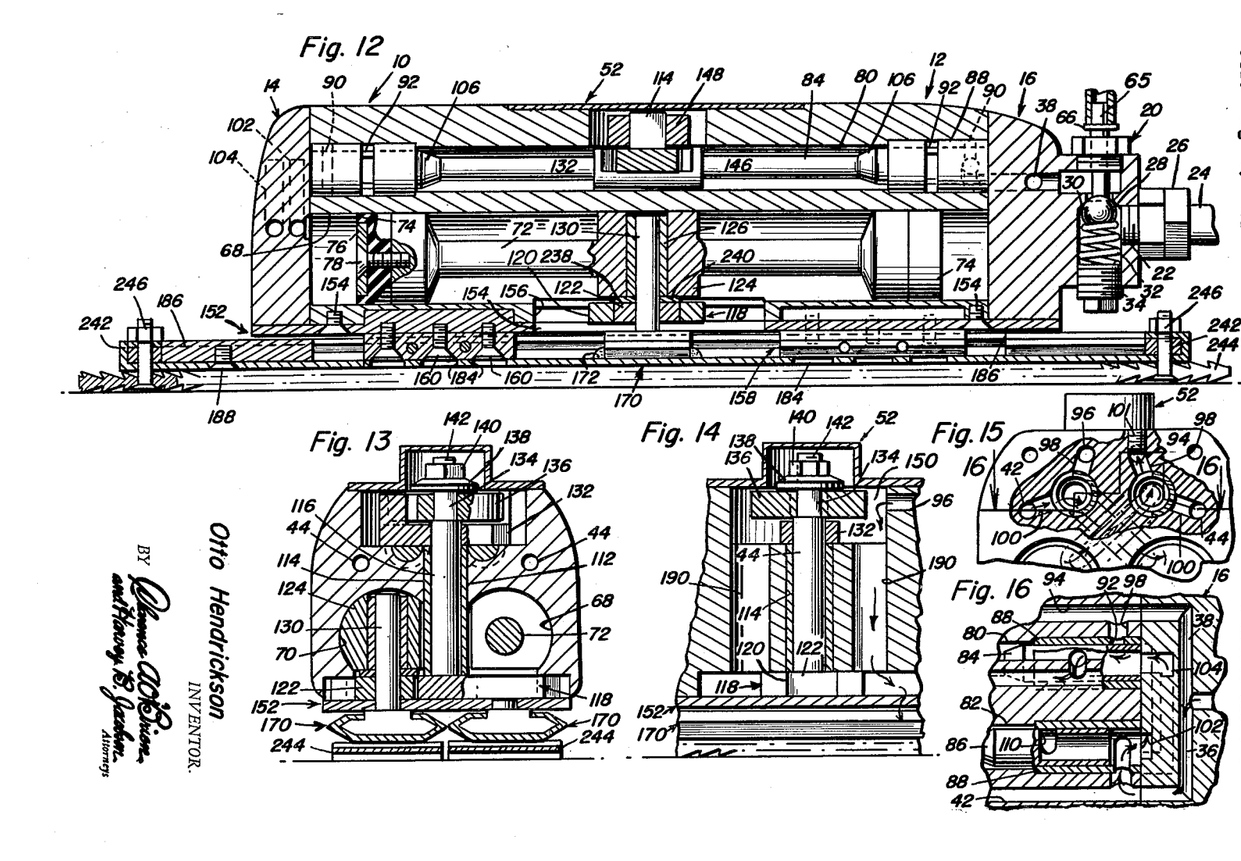
FIGURE 12 is a longitudinal vertical sectional view taken substantially upon the plane indicated by the section line 12—12 of FIGURE 1.
FIGURE 13 is a transverse vertical sectional view taken substantially upon the plane indicated by the section line 13—13 of FIGURE 1.
FIGURE 14 is an enlarged fragmentary longitudinal vertical sectional view taken substantially upon the plane indicated by the section line 14—14 of FIGURE 1.
FIGURE 15 is a fragmentary enlarged elevational view similar to that of FIGURE 7 with parts being broken away and shown in section to illustrate the exhaust and intake ports.
FIGURE 16 is a horizontal fragmentary sectional view taken substantially upon the plane indicated by the section line 16—16 of FIGURE 15 with parts being broken away and shown in section.

With attention now directed to FIGURES 11–13 it may be seen that the body 12 has a pair of cylinder bores 68 and 70 formed therein and that each bore has a double-ended piston 72 slidably disposed therein. A pair of resilient fluid pressure sealing heads 74 are secured to opposite ends of each piston 72 by means of a retaining washer 76 and a retaining screw 78. Additionally, the body 12 is provided with a pair of upper valve member bores 80 and 82 in which there is reciprocal a pair of valve members 84 and 86 respectively. The opposite ends of each valve member bore is diametrically enlarged and has a valve member sleeve 88 disposed therein. The valve member sleeves 88 extend substantially the entire length of the diametrically enlarged portion of the corresponding valve member bore and the corresponding head portions 14 and 16 retain the valve member sleeves 88 within the corresponding diametrically enlarged portions of the valve member bores 80 and 82.

Figure 6:
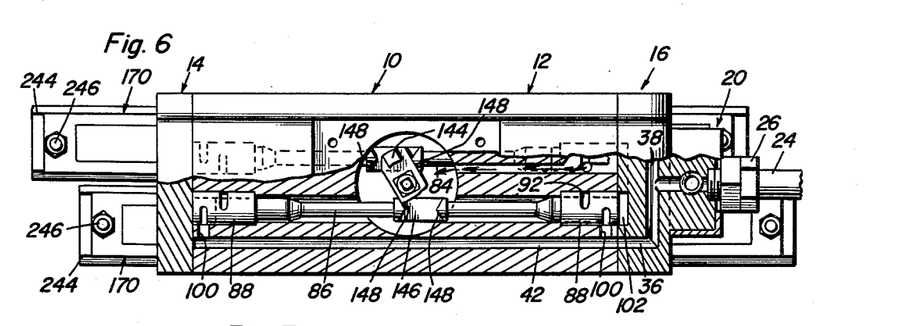
FIGURE 6 is a top plan view similar to FIGURE 5 with parts being broken away and showing the valve structure of the filing machine.
Figures 18, 19, 20, 21:
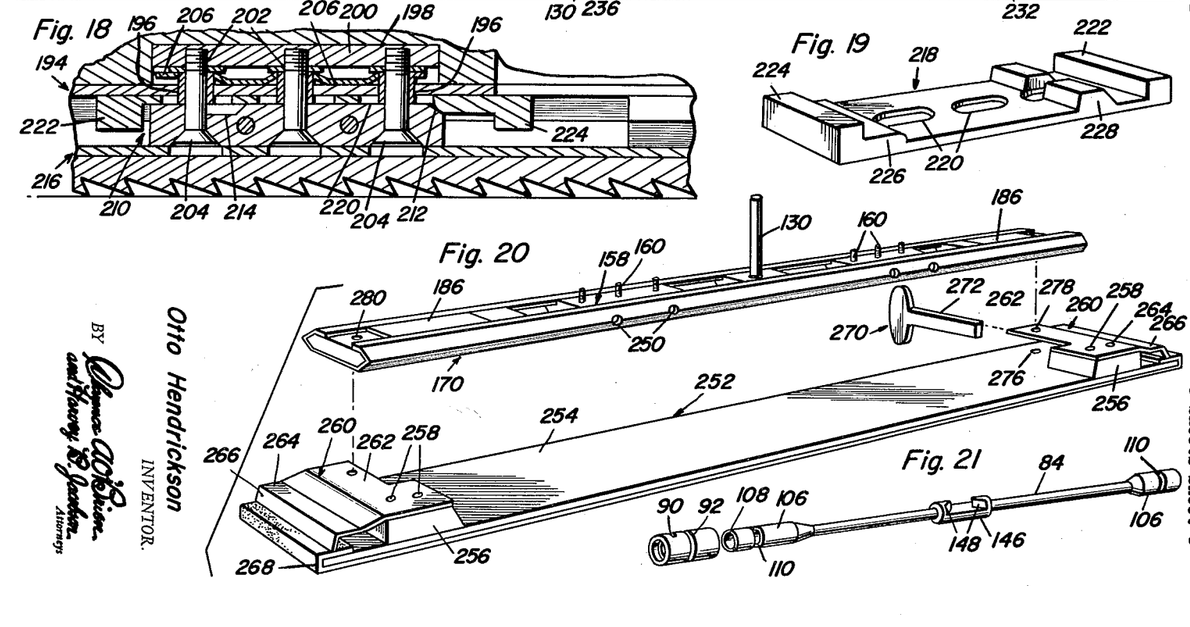
FIGURE 18 is an enlarged fragmentary vertical sectional view similar to that of FIGURE 17 and showing the details of construction of the modified form of tool carrier.
FIGURE 19 is a perspective view of a portion of the tool carrier illustrated in FIGURE 18.
FIGURE 20 is an exploded perspective view of an abrasive holder attachment adapted for removable securement to either form of tool carriers illustrated in FIGURES 12 and 17.
FIGURE 21 is a perspective view of one of the valve assemblies of the filing machine.

From FIGURES 6 and 21 of the drawings it may be seen that each valve member sleeve 88 includes an inlet slot 90 and an exhaust slot 92 longitudinally spaced therefrom. The slots 90 and 92 open radially in opposite directions and extend circumferentially about the corresponding sleeve 88. In addition, the inlet slot 90 is disposed adjacent the outer end of the corresponding sleeve 88 and the exhaust slot 92 is formed in the mid-portion of each valve member sleeve 88. The body 12 has a pair of exhaust passages 94 and 96 formed longitudinally therethrough as can best be seen from FIGURES 15 and 16 of the drawings and exhaust ports 98 communicate each of the exhaust passages with the associated exhaust slots 92. In addition, each of the inlet passages 42 and 44 is communicated with the corresponding inlet slot 90 by means of an inlet port 100, and the ends of the exhaust passages 94 and 96 adjacent the valve assembly 20 each are provided with metering valve means in the form of a setscrew 101 for "tuning" the machine 10 and insuring the exhaust from opposite ends of the body will be equal.

Figure 7:
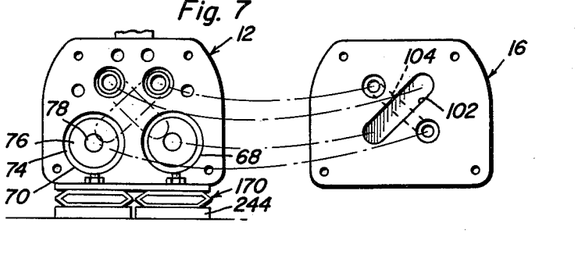
FIGURE 7 is a fragmentary right end elevational view of the machine illustrated in FIGURE 6 with the right end head portion exploded.
Figure 8:
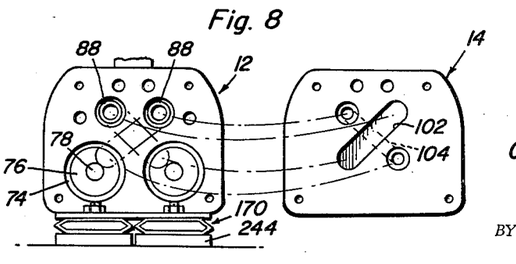
FIGURE 8 is a fragmentary left end elevational view of the machine illustrated in FIGURE 6 with the left end head portion exploded.
Figure 9:
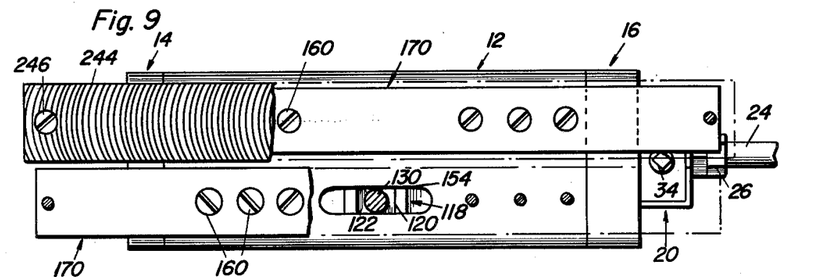
FIGURE 9 is a bottom plan view of the machine with parts thereof being broken away and shown in section.
Figure 10:
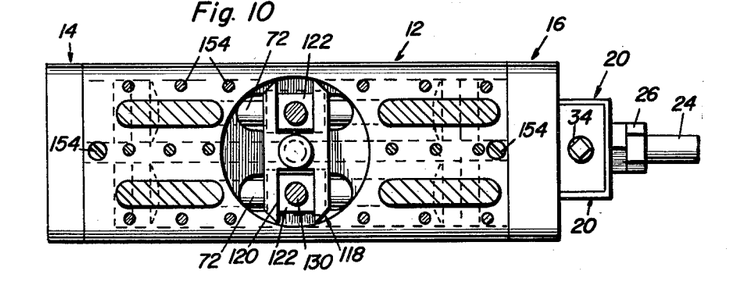
FIGURE 10 is a horizontal sectional view taken substantially upon the plane indicated by the section line 10—10 of FIGURE 2.

As can best be viewed in FIGURES 7, 8 and 12, each of the head portions 14 and 16 includes diagonal inner and outer passages 102 and 104 which each communicate one end of a cylinder bore with an adjacent end of one of the valve member sleeves 88.

With attention again invited to FIGURE 21 of the drawings it will be noted that each of the valve members 84 includes a pair of diametrically enlarged end portions which are each provided with a longitudinally extending blind bore 108. In addition, each of the diametrically enlarged end portions is provided with a radially opening and circumferentially extending slot 110, which opens into the blind bore 108.

With attention now directed to FIGURE 13 of the drawings it will be seen that the body 12 includes a vertically extending bore 112 in which there is secured a sleeve 114. The sleeve 114 projects into the cylinder bores 68 and 70 as can best be viewed from FIGURES 11 and 13 and rotatably receives a pivot shaft 116 whose lower end is provided with a crosshead assembly generally referred to by the reference numeral 118, see FIGURE 11. The crosshead assembly 118 includes a pair of radial slots 120 which are formed in opposite ends thereof and slidably receive apertured bearing blocks 122. Accordingly, the bearing blocks 122 are slidingly disposed in the slots 120 for movement toward and away from the axis of oscillation of the pivot shaft 116. Each of the pistons 72 includes a diametrically enlarged mid-portion 124 which has a hollow sleeve 126 secured therethrough. The diametrically enlarged mid-portion 124 of each piston 72 is provided with a flat portion 128 which provides clearance for the sleeve 114, see FIGURE 13.

A connecting pin 130 is rotatably received in each sleeve 126 and also within the corresponding slide block 122 whereby the pistons 72 are connected together for equal and opposite reciprocation within the bores 68 and 70.

It will be noted that the upper end of the pivot shaft 116 extends beyond the sleeve 114 and has rotatably journalled thereon a crosshead actuator 132. The pivot shaft 116 is provided with a noncircular portion 134 disposed above the crosshead actuator 132 on which a double notched actuator drive member 136 is keyed and secured by means of a retaining washer 138 and a threaded fastener 140 secured to the externally threaded terminal upper end portion 142 formed on the pivot shaft 116.

The crosshead actuator 132 includes a pair of opposite end upwardly projecting lugs 144 which are received in the notched opposite ends of the member 136. Accordingly, upon oscillation of the pivot shaft 116 effected by equal and opposite reciprocation of the pistons 72 the crosshead actuator 132 will be oscillated.

With attention now directed to FIGURES 6 and 21 it will be noted that each valve member 84 and 86 includes a diametrically enlarged mid-portion 146 which includes two pair of angularly disposed and longitudinally spaced abutment faces 148 which are engageable by the opposite ends of the crosshead actuator 132. It will be noted that the opposite ends of the crosshead actuator 132 are loosely received between corresponding pairs of abutment faces 148 in order to provide a lost motion connection between the crosshead actuator 132 and the valve members 84 and 86. In addition, the lugs 144 may be loosely received within the notched end portions of the member 136 in order to provide a further lost motion connection between the crosshead actuator 132 and the valve members 84 and 86. It is to be understood that the actuator 132 and the member 136 could be formed of one piece if desired and still provide the desired lost motion connection between the valve members 84 and 86 and the pivot shaft 116.

Thus, it may be seen that the valve member 84 or 86 immediately disposed above each piston 72 is operatively connected to that piston in a parallel manner for like reciprocation thereby.

The body 12 has a central cavity 150 formed in its upper portion which is covered by the cover plate portion 52 and houses the crosshead assembly defined by the crosshead actuator 132 and the member 136.

A base plate generally referred to by the reference numeral 152 is secured to the lower end of the body 12 by means of fasteners 154, see FIGURE 12. The base plate 152 is provided with a pair of elongated openings 154 aligned with the lower cavity 156 formed in the lower portion of the body 12 for receiving the lower ends of the connecting pins 130.

Figure 22:
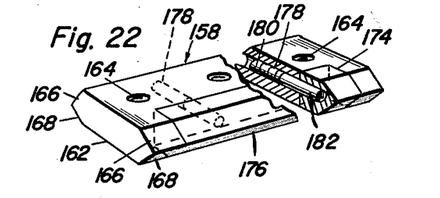
FIGURE 22 is an enlarged perspective view of one of the slide member assemblies of the filing machine with parts thereof being broken away and shown in section.

With attention now directed to FIGURES 12, 13 and 22, it will be seen that a pair of slide member assemblies generally referred to by the reference numeral 158 are secured to the base plate 152 by means of suitable fasteners 160. Each of the slide member assemblies 158 includes a generally plate-like slide member 162 which is suitably apertured as at 164 to receive the fasteners 160. The upper and lower surfaces of the slide member 162 are substantially planar and parallel as are the opposite end surfaces thereof. However, the opposite longitudinal side surfaces of the slide members 162 each includes a pair of angularly related surfaces 166 and 168. The opposite side surfaces and the upper and lower surfaces of each slide member 162 define bearing surfaces and it will be noted that the lower end of each connecting pin 130 is secured to a generally tubular and elongated tool carrier generally referred to by the reference numeral 170 in any convenient manner such as by welding 172.

The tool carriers 170 include opposite side inner surfaces complementary to the angularly disposed surfaces 166 and 168 of each slide member 162 and it will be noted that each slide member 162 has an outwardly opening notch 174 formed therein in which there is disposed an adjusting member 176 whose outer surfaces form continuations of the corresponding outer surfaces of the slide member 162. However, the slide member 162 has a pair of threaded bores 178 formed therein in which there is threadedly engaged a setscrew 180. Each of the members 176 includes an abutment pin 182 which is slidingly received in the end of the corresponding bore adjacent the notch 174. Accordingly, the member 176 may be adjusted inwardly and outwardly of the notch 174 by adjustment of the setscrews 178. In this manner, the angularly related surfaces of the member 176 corresponding to the adjacent angularly disposed surfaces 166 and 168 of the slide member 162 may be adjustably positioned relative to the remote angularly related surfaces 166 and 168 of that slide member 162 and the clearance between the opposite sides of the slide members 162 and the corresponding inner surfaces of the tool carriers 170 may be adjusted by means of the setscrews 178.

It will be noted that the tool carriers 170 are each provided with access openings 250, see FIGURE 20, through which access may be had to the outer ends of the setscrews 178 and access openings 184 through which access may be had to the fasteners 160, see FIGURE 12.

The opposite ends of the tool carriers 170 each have abutment blocks 186 secured therein by means of fasteners 188, see FIGURE 12. The adjacent ends of the abutment blocks 186 are engageable with the remote ends of the slide member assemblies 158 for limiting reciprocal movement of the tool carriers 170.

In operation, as one end of one piston 72 moves away from one of the head portions 14 or 16, the corresponding valve member 84 is also moved away from that head portion. Upon movement of a valve member away from one of the head portions the end of that valve member 84 will uncover the inlet slot 92 in the corresponding valve member sleeve 88 and thus admit air under pressure into the interior of that valve member sleeve 88 through the corresponding inlet passage 44 and inlet port 100 from the corresponding branch conduit. Then, the air under pressure will be admitted into the opposite cylinder bore 68, through diagonal passage 102 in order to force the piston therein away from the adjacent head portion. This will of course stop the movement of the first piston 72 away from the head portion. In addition, as one of the valve members is moving away from one head portion, the other valve member is moving toward that head portion as illustrated in FIGURE 16. As the valve member 84 approaches its limit position of movement toward the head portion 16, the slot 110 registers with the exhaust slot 92 and the exhaust port 98. The air under pressure from the remote cylinder bore 70 then passes through the outermost passage 104 in the head portion 16 into the open end of the valve member 84 and out through the slot 110 into the corresponding exhaust passage 96.

It will be noted that at least one of the exhaust passages 96 opens into the cavity or recess 150 whereupon the exhausted air under pressure will be directed downwardly through the passages 190 communicating the recesses or cavities 150 and 156, and that the intake and exhausting of air under pressure through the head portions 14 and 16 for each of the cylinder bores 68 and 70 is carried out simultaneously in reverse at opposite ends of the cylinder bores 68 and 70. Additionally, it will be noted that the passages 102 and 104 each function as inlet and exhaust passages. Still further, as each valve member 84 and 86 uncovers the associated inlet slot 90, the air pressure within the corresponding valve member sleeve 88 will urge that valve member 84 further toward the full inlet position by means of air under pressure being applied to the end of the valve member. Accordingly, the valve members 84 and 86 also act as pressure responsive valve members for assisting in movement of the valve members 84 and 86 toward full inlet positions upon initial movement of the valve members 84 and 86 to the inlet positions.

Parallel, oppositely reciprocating, working members of this type have many times become prohibitive for hand use since the opposite reciprocation of the pistons tend to produce oscillatory motion about an axis perpendicular to the plane of the working members. The device of the present invention virtually eliminates this prohibitive result by placing the pistons very close to each other thereby eliminating the large couple produced by widely spread pistons. Only a small amount of desirable oscillatory motion is produced allowing the working members to overlap each other to produce a smoothly worked piece of material devoid of any ridges or grooves produced by spaced work members working in a straight line.

Furthermore, oscillatory motion about an axis transverse to the reciprocating of the working members is eliminated by placing the pistons close to the bottom of the machine near the working members. This along with the cushioning action resulting from compressing some of the exhaust air at the end of each working stroke produces a smooth running, easily handled machine.

Figure 17:
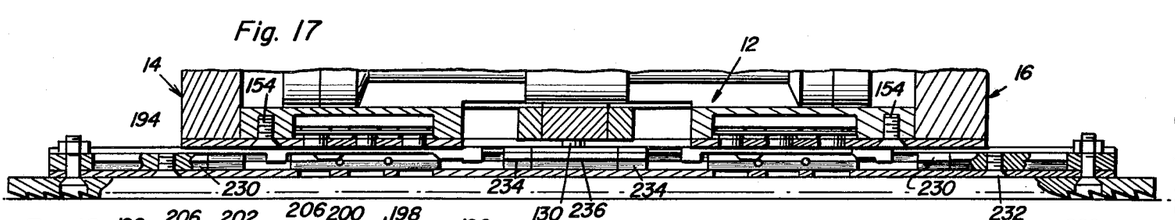
FIGURE 17 is a fragmentary longitudinal vertical sectional view similar to that of FIGURE 12 but showing a modified form of tool carrier.

With attention now directed to FIGURES 17–19 of the drawings there will be seen a modified form of base plate generally referred to by the reference numeral 194. The base plate 194 has a pair of sets of openings 196 formed therein and each set of openings 196 opens into a cavity 198 formed in the bottom of the body 112. A retainer 200 is received in the cavity 198 and has a plurality of threaded bores 202 formed therein in which are secured the threaded end portions of fasteners 204 which are similar to fasteners 160.

A pair of apertured leaf springs 206 are disposed in each cavity 98 between the retainer 200 and the base plate 194. Each slide member assembly is generally referred to by the reference numeral 210 and is substantially identical with the slide member assemblies 158 with the exception being that each is provided with a bevelled end surface 212 and a recess 214. In addition, while the tool carrier 216 is substantially identical to the tool carrier 170, a camming and striker plate assembly generally referred to by the reference numeral 218 is provided and includes three elongated slots 220.

Each camming and striker plate assembly 218 includes a pair of opposite end abutment portions 222 and 224 which are engageable with opposite ends of the corresponding slide member assembly 210. In addition, the camming and striker plate assemblies 218 each includes a camming step 226 and a camming lug 228. From FIGURE 18 of the drawings it may be observed that the bevelled surface 212 engages the camming step 226 and that the camming lug 228 is received in the recess 214. Accordingly, upon reciprocation of the tool carrier 216 by means of the associated connecting pin 130 the tool carrier 216 will be cammed away from the body 12 on the power stroke and moved toward the body 12 on the return stroke.

As the tool carrier 216 is provided with end abutment blocks 230 which are secured thereto by means of fasteners 232 and center abutment blocks 234 disposed on opposite sides of the anchor 236 secured to the lower end of the connecting pin 130, upon movement of the tool carrier 216 from a rearmost position moved to the left as viewed in FIGURES 17 and 18 to a forwardmost position moved to the right, the abutment block 230 on the left and the abutment block 234 on the right in FIGURE 17 engage the abutment portions 222 and 224 of the camming assemblies 218 to urge the latter forwardly relative to the corresponding slide member assembly 210 whereupon the camming lugs 228 will be seated in the recesses 214 and the bevelled surface 210 will move off of the camming steps 226. Then, upon rearward movement of the tool carriers 216, the abutment block 234 on the left and the abutment block 230 on the right will engage the abutment portions 222 of the camming assemblies 218 to urge the camming assemblies 218 rearwardly relative to the corresponding slide member assemblies 210 thereby causing the cam steps 226 to ride up on the bevelled surfaces 212 and the camming lug 228 to ride out of the recess 214 and onto the upper surfaces of the slide member assemblies 210. Accordingly, upon reciprocation of the tool carriers 216, they will be alternately laterally displaced toward and away from the body 12.

With attention again directed to FIGURE 12 of the drawings it will be noted that the cavity 156 opens into the cylinder bores 68 and 70 and that the crosshead 118 actually projects upwardly into the cylinder bores 68 and 70. In addition, a suitable bearing washer 238 may be disposed between corresponding diametrically enlarged portions 124 of the pistons 72 and the corresponding slide blocks 122. In addition, it will be noted that the lower portions of the diametrically enlarged portions 124 are cut away as at 240 to provide clearance for the friction washers 238 and portions of the crosshead 118 which project into the cylinder bores 68 and 70.

It will also be noted that the tool carriers 170 each are provided with apertures 242 at opposite ends for removably securing a body file 244 to each tool carrier 170 by means of suitable fasteners 246 secured through the body files 244 and the apertures 242.

In FIGURE 20 an abrasive holder attachment is generally designated by the reference numeral 252 and includes an elongated panel-like semi-rigid mounting member 254. A pair of spacer blocks 256 are secured to opposite ends of the mounting member 254 by means of suitable fasteners 258 and it will be noted that the spacer blocks 256 extend slightly less than one-half the width of the mounting member 254.

The fasteners 258 are also utilized to secure a pair of spring clips 260 to the mounting member 54 with the base flanges 262 thereof overlying the upper surfaces of the spacer blocks 256. Each of the base flanges 262 includes a laterally offset flange 264 which terminates at its free end in a downturned retaining flange 266 whose free end closely overlies the upper surface of the mounting member 254.

An elongated sheet of sandpaper or other suitable abrasive material is designated by the reference numeral 268 and is disposed immediately beneath the mounting member 254 and is slightly longer than the latter. The abrasive surface of the sandpaper 268 faces downwardly and the opposite end portions of the sheet of sandpaper 268 are bent upwardly and rearwardly to embrace the opposite end portions of the mounting member 254. An insertion and tensioning key 270 is provided and includes a generally rectangular shank portion 272. The width of the shank portion 272 is slightly greater than the distance between the offset flange 264 and the mounting member 254. Accordingly, the shank portion 272 of the key 270 may be inserted between the offset flanges 264 and the mounting member 254 and rotated in order to urge the retaining flanges 266 away from the mounting member 254. Then, the opposite ends of the sheet of sandpaper 268 may be inserted beneath the retaining flanges 266. Then, the shank portion 272 of the key 270 is again positioned between each of the offset flanges 264 and the corresponding end of the sheet of sandpaper 268. The shank portion 272 is inclined downwardly and outwardly and engages the sheet of sandpaper 268 along its lower side edge. Then, the key 270 may be rotated about the longitudinal axis of the shank 272 in order to move the lower edge portion of the shank 272 toward the corresponding spacer block 256 in order that the shank portion 272 may be engaged with a selected one of the opposite ends of the sheet of sandpaper 268 in order to draw that end portion of the sandpaper 268 toward the remote end of the mounting member 254. In this manner, the sheet of sandpaper 268 is stretched taut across the bottom of the mounting member 254.

It will also be noted that the portions of the flanges 262 which are not disposed over a spacer block 256 define a pocket in which to laterally receive the corresponding end portion of a tool carrier 170. Accordingly, the opposite ends of the tool carrier 170 may be laterally received within the pockets defined by the nonsupported portions of the base flanges 262 and secured beneath these portions of the base flanges 262 by means of suitable fasteners secured through the aligned bores 276 and 278 formed in the mounting member 254 and the base flanges 262 and the bores 280 formed in the opposite ends of the tool carrier 170. In this manner, each of the tool carriers 170 may have an abrasive holder attachment 252 secured thereto in lieu of the body file 244.

With attention again invited to FIGURE 2 of the drawings it will be seen that the body 12 includes a forward handgrip 274 which may be used in conjunction with the handle portion 50 to properly support the pneumatic filing machine 10 relative to a working surface. Various types of files may be secured to the tool carriers 170 and 216.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pneumatic filing machine comprising a body, a pair of generally parallel cylinder bores formed in said body, a pair of double ended pistons reciprocal in said bores, means connecting said pistons together for simultaneous and opposite reciprocation, fluid pressure intake and exhaust means operatively associated with the opposite ends of each of said bores, valve means including movable actuator means operatively connected to and driven by said connecting means and operable in conjunction with said intake and exhaust means alternately admitting fluid under pressure to the opposite ends of said bores and venting the latter to the ambient atmosphere in timed sequence with reciprocation of said pistons, said movable actuator means including a lost motion connection with said connecting means and said valve means including pressure responsive means for rapidly moving said actuator means to the full open inlet position in response to initial movement of said actuator means toward the full open inlet position independently of said connecting means.

2. The combination of claim 1 including a pair of tool carriers, means mounting said tool carriers on said body for reciprocation in directions generally paralleling the reciprocal movement of said pistons, said connecting means drivingly connecting said pistons to said tool carriers and including means for inversely reciprocating said tool carriers in response to inverse reciprocation of said pistons, said connecting means including a pivot shaft journalled for rotation in said body about an axis passing between the mid-portions of said cylinder bores and disposed at substantially right angles to the longitudinal axes of said bores, said pivot shaft including first crosshead means at one end operatively connected to said tool carriers and said pistons, said tool carriers closely underlying said bores so as to minimize the tendency of said tool carriers, when engaged with a workpiece, to oscillate said body about an axis extending transversely of the longitudinal axes of said bores in a plane generally paralleling a plane in which said bores are disposed.

3. A pneumatic filing machine comprising a body, a pair of generally parallel cylinder bores formed in said body, a pair of double ended pistons reciprocal in said bores, means connecting said pistons together for simultaneous and opposite reciprocation, fluid pressure intake and exhaust means operatively associated with the opposite ends of each of said bores, and valve means including movable actuator means operatively connected to and driven by said connecting means and operable in conjunction with said intake and exhaust means alternately admitting fluid under pressure to the opposite ends of said bores and venting the latter to the ambient atmosphere in timed sequence with reciprocation of said pistons, a pair of tool carriers, means mounting said tool carriers on said body for reciprocation in directions generally paralleling the reciprocal movement of said pistons, said connecting means drivingly connecting said pistons to said tool carriers and including means for inversely reciprocating said tool carriers in response to inverse reciprocation of said pistons, said mounting means also including means positively laterally displacing each of said tool carriers in a reciprocatory manner in a plane disposed normal to the direction of reciprocation of said tool carriers and in direct response to reciprocation of said tool carriers.

4. The combination of claim 3 including an abrasive holder attachment removably secured to each of said tool carriers.

5. The combination of claim 4 wherein each of said abrasive holder attachments includes means adapted to releasably secure a flexible sheet of abrasive thereto.

6. A pneumatic filing machine comprising a body, a pair of generally parallel cylinder bores formed in said body, a pair of double ended pistons reciprocal in said bores, means connecting said pistons together for simultaneous and opposite reciprocation, fluid pressure intake and exhaust means operatively associated with the opposite ends of each of said bores, and valve means including movable actuator means operatively connected to and driven by said connecting means and operable in conjunction with said intake and exhaust means alternately admitting fluid under pressure to the opposite ends of said bores and venting the latter to the ambient atmosphere in timed sequence with reciprocation of said pistons, a pair of tool carriers, means mounting said tool carriers on said body for reciprocation in directions generally paralleling the reciprocal movement of said pistons, said connecting means drivingly connecting said pistons to said tool carriers and including means for inversely reciprocating said tool carriers in response to inverse reciprocation of said pistons, said mounting means also including means positively laterally displacing each of said tool carriers in a reciprocatory manner in a plane disposed normal to the direction of reciprocation of said tool carriers and in direct response to reciprocation of said tool carriers, said tool carriers each being elongated in the direction of their reciprocating movement, slightly laterally spaced apart from each other, and disposed in a single plane generally paralleling a single plane passing along and through the longitudinal axes of said cylinder bores.

7. The combination of claim 6 wherein said connecting means includes a pivot shaft journalled for rotation in said body about an axis passing between the mid-portions of said cylinder bores and disposed at substantially right angles to the longitudinal axes of said bores.

8. The combination of claim 6 wherein said connecting means includes a pivot shaft journalled for rotation in said body about an axis passing between the mid-portions of said cylinder bores and disposed normal to a plane containing said bores, said pivot shaft including first crosshead means at one end operatively connected to said tool carriers and said pistons, said tool carriers closely underlying said bores so as to minimize the tendency of said tool carriers, when engaged with a workpiece, to oscillate said body about an axis extending transversely of the longitudinal axes of said bores in a plane generally paralleling planes containing corresponding pistons and tool carriers.

9. The combination of claim 8 wherein said valve means includes a pair of elongated double ended valve members comprising said actuator means mounted for longitudinal reciprocal movement in said body, said pivot shaft including second crosshead means at the other end and operatively connected to said valve members.

10. A pneumatic filing machine comprising a body, a pair of generally parallel cylinder bores formed in said body, a pair of double ended pistons reciprocal in said bores, means connecting said pistons together for simultaneous and opposite reciprocation, fluid pressure intake and exhaust means operatively associated with the opposite ends of each of said bores, and valve means including movable actuator means operatively connected to and driven by said connecting means and operable in conjunction with said intake and exhaust means alternately admitting fluid under pressure to the opposite ends of said bores and venting the latter to the ambient atmosphere in timed sequence with reciprocation of said pistons, a pair of tool carriers, means mounting said tool carriers on said body for reciprocation in directions generally paralleling the reciprocal movement of said pistons, said connecting means drivingly connecting said pistons to said tool carriers and including means for inversely reciprocating said tool carriers in response to inverse reciprocation of said pistons, said mounting means also including means positively laterally displacing each of said tool carriers in a reciprocatory manner in a plane disposed normal to the direction of reciprocation of said tool carriers and in direct response to reciprocation of said tool carriers, said tool carriers each being elongated in the direction of their reciprocating movement, slightly laterally spaced apart from each other, and disposed in a single plane generally paralleling a single plane passing along and through the longitudinal axes of said cylinder bores, said valve means including a pair of elongated double ended valve members comprising said actuator means mounted for longitudinal reciprocal movement in said body, said connecting means including a pivot shaft journaled for rotation in said body about an axis passing between the mid-portions of said cylinder bores and disposed at substantially right angles to the longitudinal axes of said bores, said pivot shaft including second crosshead means at the other end and operatively connected to said valve members, said valve members being disposed in a single plane generally paralleling the single planes in which said pistons and tool carriers are disposed, the plane containing said pistons being disposed intermediate the planes containing said tool carriers and said valve members.

11. A pneumatic filing machine comprising a body, a pair of generally parallel cylinder bores formed in said body, a pair of double ended pistons reciprocal in said bores, means connecting said pistons together for simultaneous and opposite reciprocation, fluid pressure intake and exhaust means operatively associated with the opposite ends of each of said bores, and valve means including movable actuator means operatively connected to and driven by said connecting means and operable in conjunction with said intake and exhaust means alternately admitting fluid under pressure to the opposite ends of said bores and venting the latter to the ambient atmosphere in timed sequence with reciprocation of said pistons, a head portion carried by each end of said body and including inlet and exhaust passages, said valve means being operable for controlling the ingress of fluid under pressure to opposite ends of said bores and the venting of fluid pressure therefrom from points in said body immediately adjacent the corresponding end of said body and head portion, said body including a pair of longitudinally extending bores opening through opposite ends of said body in which valve members are reciprocal, the opposite ends of said valve members including longitudinally extending blind bores, each of said head portions including a pair of passages communicating each of the corresponding ends of said cylinder bores with the adjacent end of one of said valve member bores, said fluid pressure inlet and exhaust means each including a port opening into each of the opposite ends of said valve member bores, said valve members including ports opening laterally into said blind bores and being operable for intermittently communicating said each of said ports with the corresponding passage in said heads in timed sequence with reciprocation of said pistons.

12. The combination of claim 11 wherein each of the bores in which said valve members are reciprocable generally parallel and are disposed above a corresponding one of said cylinder bores, corresponding ones of said pistons and valve members being connected together for like reciprocation, the ends of each of said valve members controlling the flow of fluid pressure into the corresponding ends of the remote cylinder bores.

13. A pneumatic filing machine comprising a body, a pair of generally parallel cylinder bores formed in said body, a pair of double ended pistons reciprocal in said bores, means connecting said pistons together for simultaneous and opposite reciprocation, fluid pressure intake and exhaust means operatively associated with the opposite ends of each of said bores, and valve means including movable actuator means operatively connected to and driven by said connecting means and operable in conjunction with said intake and exhaust means alternately admitting fluid under pressure to the opposite ends of said bores and venting the latter to the ambient atmosphere in timed sequence with reciprocation of said pistons, a pair of tool carriers, means mounting said tool carriers on said body for reciprocation in directions generally paralleling the reciprocal movement of said pistons, said connecting means drivingly connecting said pistons to said tool carriers and including means for inversely reciprocating said tool carriers in response to inverse reciprocation of said pistons, said mounting means also including means positively laterally displacing each of said tool carriers in a reciprocatory manner in a plane disposed normal to the direction of reciprocation of said tool carriers and in direct response to reciprocation of said tool carriers, each of said tool carriers being tubular and including opposing upper and lower walls and interconnecting side walls, each of said upper walls having at least one longitudinally extending slot formed therein, at least one slide member slidingly disposed in each of said tool carriers and including means secured through the corresponding slot fixedly securing said slide to said body.

14. The combination of claim 13, wherein each of said slide members includes a pair of opposite bearing surfaces disposed in sliding contacting relation with complementary inner surfaces of the corresponding tool carrier.

15. The combination of claim 14 wherein each of said slide members includes means for adjustably positioning one of said bearing surfaces relative to the other bearing surface.

16. The combination of claim 15 wherein each of said bearing surfaces comprises a pair of angularly disposed surfaces.

17. A pneumatic filing machine comprising a body, a pair of generally parallel cylinder bores formed in said body, a pair of double ended pistons reciprocal in said bores, means connecting said pistons together for simultaneous and opposite reciprocation, fluid pressure intake and exhaust means operatively associated with the opposite ends of each of said bores, and valve means including movable actuator means operatively connected to and driven by said connecting means and operable in conjunction with said intake and exhaust means alternately admitting fluid under pressure to the opposite ends of said bores and venting the latter to the ambient atmosphere in timed sequence with reciprocation of said pistons, said fluid pressure intake means including control valve means simultaneously controlling the amount of fluid under pressure admitted into the opposite ends of said cylinder bores and means also adjustably individually controlling the amount of fluid under pressure admitted into each of the opposite ends of said cylinder bores independently of said control valve means.

18. A pneumatic filing machine comprising a body, a cylinder bore formed in said body, a double ended piston reciprocal in said bore, fluid intake and exhaust means operatively associated with the opposite ends of said bore, valve means including movable actuator means operatively connected to and driven by said piston and operable in conjunction with said intake and exhaust means alternately admitting fluid under pressure to the opposite ends of said bore and venting the latter to the ambient atmosphere in timed sequence with reciprocation of said piston, said movable actuator means including a lost motion connection with said piston and including pressure responsive means for rapidly moving said actuator means to the full open inlet position in response to initial movement of said actuator means toward the full open inlet position independently of said piston.

19. The combination of claim 18 including a tool carrier, means mounting said tool carrier on said body for reciprocation in directions generally paralleling the reciprocal movement of said piston, means drivingly connecting said piston to said tool carrier and including means for inversely reciprocating said tool carrier in response to inverse reciprocation of said piston, said mounting means also including means positively laterally displacing said tool carrier in a reciprocatory manner in a plane disposed normal to the direction of reciprocation of said tool carrier and in direct response to reciprocation of said tool carrier.

20. A pneumatic filing machine comprising a body, a pair of generally parallel cylinder bores formed in said body, a pair of double ended pistons reciprocal in said bores, means connecting said pistons together for simultaneous and opposite reciprocation, fluid pressure intake and exhaust means operatively associated with the opposite ends of each of said bores, and valve means including movable actuator means operatively connected to and driven by said connecting means and operable in conjunction with said intake and exhaust means alternately admitting fluid under pressure to the opposite ends of said bores and venting the latter to the ambient atmosphere in timed sequence with reciprocation of said pistons, a pair of tool carriers, means mounting said tool carriers on said body below said cylinder bores for reciprocation in directions generally paralleling the reciprocal movement of said pistons, the center and opposite end portions of said pistons being diametrically enlarged and disposed in sliding contacting relation with the surfaces of said bores, said body having a pair of generally parallel slots formed therein communicating said bores with the exterior of said body and extending longitudinally of the mid-portions of said bores, each of said center portions of said pistons having a diametrical bore formed therein, each of said tool carriers including an upstanding pin slidably received in the corresponding slot with its upper end snugly received in the corresponding diametrical bore thereby defining connecting means connecting said tool carriers to said pistons for reciprocation therewith.

21. The combination of claim 20 wherein said connecting means includes a pivot shaft journaled for rotation in said body about an axis passing between the mid-portions of said cylinder bores and disposed normal to a plane containing said bores, said pivot shaft including first crosshead means at one end operatively connected to said tool carriers and said pistons, said tool carriers closely underlying said bores so as to minimize the tendency of said tool carriers, when engaged with the workpiece, to oscillate said body about an axis extending transversely of the longitudinal axes of said bores in a plane generally paralleling planes containing corresponding pistons and tool carriers, said valve means including a pair of elongated double ended valve members comprising said actuator means mounted for longitudinal reciprocal movement in said body, said pivot shaft including second crosshead means at the other end and operatively connected to said valve members, said cylinder bores being spaced adjacent each other and said pivot shaft extending through adjacent portions of the mid-portions of said cylinder bores, said piston mid-portions being flattened on adjacent sides so as to provide clearance between said piston mid-portions and said pivot shaft.

22. The combination of claim 21 wherein said movable actuator means includes a lost motion connection with said connecting means and said valve means includes pressure responsive means for rapidly moving said actuator means to the full open inlet position in response to initial movement of said actuator means toward the full open inlet position independently of said connecting means.

23. A pneumatic filing machine comprising a body, a cylinder bore formed in said body, a double ended piston reciprocal in said bore, fluid pressure intake and exhaust means operatively associated with the opposite ends of said bore and valve means operatively connected to and driven by said piston and operable in conjunction with said intake and exhaust means for alternately admitting fluid under pressure into the opposite ends of said bore and venting the latter to the ambient atmosphere in timed sequence with reciprocation of said piston, a tool carrier, means mounting said tool carrier on said body for reciprocation in directions generally paralleling the reciprocal movement of said piston, connecting means drivingly connecting said piston to said tool carrier for reciprocating said tool carrier in response to reciprocation of said piston, said tool carrier being disposed beneath said bore and closely adjacent the same with the spacing between said tool carrier and said bore being less than the radius of said bore whereby the tendency of said body to oscillate about an axis extending transversely of the longitudinal axis of said bore in a plane generally paralleling a plane containing said bore and said tool carrier will be held at a minimum when the tool carriers are engaged with a workpiece.

References Cited in the file of this patent

UNITED STATES PATENTS

| | | |
|---|---|---|
| 1,492,659 | Anderson | May 6, 1924 |
| 1,590,353 | Ekstrom | June 29, 1926 |
| 1,677,112 | Anderson | July 10, 1928 |
| 2,202,072 | Wilson | May 28, 1940 |
| 2,620,775 | Champayne | Dec. 9, 1952 |
| 2,635,396 | Johnson | Apr. 21, 1953 |